United States Patent [19]
von Bose

[11] Patent Number: 6,032,090
[45] Date of Patent: Feb. 29, 2000

[54] SYSTEM AND METHOD FOR ON-BOARD DETERMINATION OF AIRCRAFT WEIGHT AND LOAD-RELATED CHARACTERISTICS

[75] Inventor: Robert J. von Bose, Saginaw, Tex.

[73] Assignee: General Electrodynamics Corporation, Arlington, Va.

[21] Appl. No.: 08/852,855

[22] Filed: May 6, 1997

[51] Int. Cl.[7] .......................... G01G 19/08; G01G 19/14
[52] U.S. Cl. ......................... 701/37; 73/65.05; 177/136; 177/141; 702/101; 701/124
[58] Field of Search .................. 701/1, 13, 29, 701/31, 36, 37, 124; 73/11.08, 11.09, 65.01, 65.05, 65.06, 65.09; 177/136, 141, 199, 208; 702/101

[56] References Cited

U.S. PATENT DOCUMENTS

| | | | |
|---|---|---|---|
| Re. 23,945 | 2/1955 | Kolisch | 235/61 |
| 2,302,458 | 11/1942 | Miner | 235/61 |
| 2,443,098 | 6/1948 | Dean | 73/68 |
| 2,520,428 | 8/1950 | Nilakantan | 235/61 |
| 2,541,429 | 2/1951 | Mathes et al. | 73/65 |
| 2,686,426 | 8/1954 | Kolisch | 73/65 |
| 2,725,193 | 11/1955 | Kolisch | 235/61 |
| 2,751,921 | 6/1956 | Baldwin et al. | 137/98 |
| 2,817,161 | 12/1957 | Stern et al. | 35/12 |
| 2,856,127 | 10/1958 | Kolisch et al. | 235/61 |
| 2,901,171 | 8/1959 | Kolisch | 235/151 |
| 2,987,254 | 6/1961 | Kolisch | 235/179 |
| 3,063,638 | 11/1962 | Kolisch | 235/193 |
| 3,191,442 | 6/1965 | Hutchinson | 73/432 |
| 3,388,242 | 6/1968 | Johnson | 235/184 |
| 3,443,077 | 5/1969 | Lettvin | 235/184 |
| 3,473,369 | 10/1969 | Garrison | 73/65 |
| 3,486,017 | 12/1969 | Arseneau | 235/193 |
| 3,486,371 | 12/1969 | Dybvad et al. | 73/88 |
| 3,494,181 | 2/1970 | Boelkins et al. | 73/88.5 |
| 3,513,300 | 5/1970 | Elfenbein et al. | 235/150 |
| 3,584,503 | 6/1971 | Semour | 73/65 |
| 3,620,074 | 11/1971 | Laimins et al. | 73/141 A |
| 3,625,053 | 12/1971 | Laimins | 73/88.5 |
| 3,626,752 | 12/1971 | Levins | 73/65 |
| 3,638,477 | 2/1972 | Brummer | 73/65 |
| 3,701,279 | 10/1972 | Harris et al. | 73/65 |
| 3,727,180 | 4/1973 | Lingel et al. | 340/27 |
| 3,746,844 | 7/1973 | Azum et al. | 235/150.2 |
| 3,800,895 | 4/1974 | Gale et al. | 177/136 |
| 3,808,954 | 5/1974 | Persson et al. | 92/65 |
| 3,822,048 | 7/1974 | Hartel | 244/104 |
| 3,826,321 | 7/1974 | Rigney et al. | 177/210 |
| 3,951,361 | 4/1976 | Hrusch | 244/102 |
| 4,092,947 | 6/1978 | Labrecque | 116/118 |

(List continued on next page.)

OTHER PUBLICATIONS

Brochure by Honeywell, Inc., "Weight and Balance System—Introducing the first realtime system for accurate weight and CG," 1989.

A.C. Macdougall and Dr. R.M.H. Cheng, "The Light–Weight System," *SAWE Journal*, 1980, pp. 41–46.

*Primary Examiner*—William A. Cuchlinski, Jr.
*Assistant Examiner*—Edward Pipala
*Attorney, Agent, or Firm*—Baker Botts L.L.P.

[57] ABSTRACT

An on-board aircraft system for determining the weight and load-related characteristics of an aircraft having landing gear struts (which each have a strut cylinder, a strut piston, and a working fluid in the strut cylinder) includes an accelerometer associated with each gear strut for measuring acceleration. The system further includes a pressure-adjustment means coupled to each strut cylinder for selectively adjusting the pressure in each strut cylinder to cause each landing gear strut to extend and retract; a plurality of pressure transducers coupled to the plurality of landing gear struts for measuring a pressure in each strut cylinder; and a computer. The computer is operable to cause retracting and extending the strut, to store pressure measurements of the strut cylinder during the retraction and extension of the strut, to store acceleration measurements corresponding to each pressure measurement taken, and to calculate the weight based on the pressure measurements and the acceleration measurements. A method of determining the weight on an aircraft is disclosed that includes use of an accelerometer.

13 Claims, 5 Drawing Sheets

U.S. PATENT DOCUMENTS

| | | | |
|---|---|---|---|
| 4,110,605 | 8/1978 | Miller | 364/463 |
| 4,210,902 | 7/1980 | Palekhin et al. | 340/310 |
| 4,225,926 | 9/1980 | Wendt | 364/463 |
| 4,269,070 | 5/1981 | Nelson et al. | 73/779 |
| 4,312,042 | 1/1982 | Bateman | 364/463 |
| 4,328,494 | 5/1982 | Goodall | 340/870 |
| 4,385,527 | 5/1983 | Raskin | 73/862 |
| 4,463,428 | 7/1984 | Gilliam | 364/463 |
| 4,490,802 | 12/1984 | Miller | 364/567 |
| 4,494,210 | 1/1985 | Miller | 364/567 |
| 4,502,555 | 3/1985 | Gower | 177/25 |
| 4,507,742 | 3/1985 | Bateman | 364/567 |
| 4,545,019 | 10/1985 | Glover | 364/463 |
| 4,548,079 | 10/1985 | Klatt | 73/432 |
| 4,639,872 | 1/1987 | McHale et al. | 364/463 |
| 4,782,706 | 11/1988 | Kister et al. | 73/779 |
| 4,935,885 | 6/1990 | McHale et al. | 364/567 |
| 4,937,754 | 6/1990 | Buisson et al. | 364/463 |
| 4,967,384 | 10/1990 | Molinar et al. | 364/567 |
| 4,969,112 | 11/1990 | Castle | 364/567 |
| 4,992,775 | 2/1991 | Castle et al. | 340/525 |
| 5,034,896 | 7/1991 | Orgun et al. | 364/463 |
| 5,131,482 | 7/1992 | Davis et al. | 177/25 |
| 5,136,513 | 8/1992 | Sol et al. | 364/463 |
| 5,167,385 | 12/1992 | Hafner | 244/76 |
| 5,170,366 | 12/1992 | Passarelli | 364/567 |
| 5,214,586 | 5/1993 | Nance | 364/463 |
| 5,257,756 | 11/1993 | Patzig et al. | 244/103 |
| 5,258,582 | 11/1993 | Junginger | 177/141 |
| 5,410,109 | 4/1995 | Tarter et al. | 177/136 |
| 5,460,340 | 10/1995 | White | 244/102 |
| 5,521,827 | 5/1996 | Lindberg et al. | 364/463 |

SYSTEM AND METHOD FOR ON-BOARD DETERMINATION OF AIRCRAFT WEIGHT AND LOAD-RELATED CHARACTERISTICS

TECHNICAL FIELD OF THE INVENTION

The present invention relates to weighing equipment, and more particularly to a system and method for on-board determination of aircraft weight and load-related characteristics.

BACKGROUND OF THE INVENTION

In aviation it is important for safety and economic reasons that the aircraft be properly loaded. An aircraft should not attempt to take off if the aircraft is too heavy or if the center of gravity is too far removed from the center of lift. Furthermore, in the commercial operation of aircraft it is desirable for economic reasons to load the aircraft with as much revenue-producing cargo as possible. Therefore, a very accurate and reliable measure of weight and balance is needed to permit loading of an aircraft to maximum capacity with assurance that safety is not compromised.

Accurate loading typically entails making sure that the gross weight of the aircraft is within acceptable limits and that the load is properly distributed. The measure of the load distribution is primarily determined by locating the longitudinal center of gravity (CG) for the aircraft. The CG should typically be within a certain range for a given load as recommended by the manufacturer and/or the Federal Aviation Administration.

The longitudinal CG may be determined by considering the weight at locations along the aircraft and using the moment (weight×distance) developed about a given reference line or datum. The sum of the moments is then divided by the total weight to arrive at one point where the plane is balanced or could be supported, which is the CG. The CG is frequently expressed in terms of percentage mean aerodynamic chord (% MAC).

Early in aviation, the importance of weight and balance was realized. To arrive at the weight under one conventional approach, the pilots frequently begin with an empty weight for the aircraft as determined by the manufacturer and/or maintenance personnel and then add the weight of the luggage, fuel, and passengers and the like as they are loaded. This technique frequently involves estimating the weight of each loaded object and raises some uncertainty in the calculation of the weight and CG; for example, a standard weight may be assumed for each person, e.g., 160–180 lbs., notwithstanding that the actual passenger may be a small child under 100 lbs. Additionally, the technique may slow the departure of the aircraft as the pilots or personnel make calculations up to the last minute before departure.

A number of on-board weighing and CG determining devices have been proposed and developed. In the past few decades, several approaches to on-board aircraft weight and balance systems have been developed. Unfortunately, these systems have not enjoyed great commercial success and acceptance apparently because of shortcomings. Such shortcomings may have included inadequate accuracy and dependability. Additionally, some designs may be too expensive to manufacture or install.

Many of the shortcomings of on-board weighing and CG determining devices have been identified. For example, in a 1980 article, Dr. R. M. H. Cheng concluded that among the main problems with on-board weighing and CG devices are friction in the oleo landing gear struts and high noise to signal ratio in strain gauged systems. A.C. Macdougall and Dr. R. M. H. Cheng, "The Light-Weight System," *SAWE Journal*, 1980, pp. 41–46. Accounting for the friction in the oleo strut is considered a major problem, and some have attempted to address this problem.

Honeywell has developed a weight and balance system that avoids the oleo strut by placing a gauge in the gear lug. The Honeywell System typically has included landing-gear-mounted deflection sensors, a calibration module containing all gear parameter information, a computer unit, a pitch attitude sensor, a cockpit display, and a remote dedicated display unit for cargo loading. The sensor used by Honeywell is alleged to be covered by U.S. Pat. No. 4,269,070, entitled Strain/Deflection Sensitive Variable Reluctance Transducer Assembly, issued May 26, 1981 to Nelson, et al., and assigned to Weico Corp. The sensor allegedly measures shear deflection directly while ignoring bending and other deflections and includes inductive mechanism rather than resistive strain gauges. The sensor is mounted on the aircraft lugs of the landing gear or installed in the axles.

Modern aircraft frequently use landing gear designs that include a shock absorbing system including a small orifice plate within the cylinder of the landing gear strut and are refereed to as "oleo shuts." Hydraulic fluid is forced through the small orifice within the strut cylinder, and the orifice in conjunction with a metering pin, which varies the flow area of the orifice, damps the transient loads on the landing gear.

On the ground, the aircraft is supported by two forces produced in the landing gear strut: (1) force produced from the pressure of the fluids in the strut on the piston and (2) a force developed through friction associated with the strut piston in the strut cylinder. Though minor, the frictional forces are too large to disregard in precision weighing. The magnitude of the frictional forces is generally not repeatable because it varies due to a number of factors including temperature (due to the varying stiffness of seals), the length of time since moving the aircraft (due to squeezing out lubricating fluid), and the direction of last motion before coming to rest (due to deformation of seal members).

Landing gear struts typically include a strut piston and a number of O-rings used to provide a seal about the piston. The O-ring seals may cause significant friction in the cylinder about the piston. The frictional forces on the O-rings and piston have previously made it difficult to directly use the pressure in the strut cylinder to arrive at an accurate measurement of the weight experienced by the strut.

U.S. Pat. No. 5,214,586 entitled Aircraft Weight and Center of Gravity Indicator issued to Nance on May 25, 1993, describes an on-board system for use in measuring and computing and displaying the gross weight and center of gravity of an aircraft. A computer receives temperature and pressure information from the landing gear struts. The computer includes software that corrects or compensates for physical changes to strut components due to temperature fluctuations, drag, and hysteresis. The accounting for drag is based, however, on a drag component determined during a calibration process. A "drag to temperature" adjustment curve or "look-up table" is charted by recording various airplane weights while the airplane is on a calibration scale and comparing those weights with corresponding pressure readings through a wide-range of temperatures. This table is used to determine the weight and consequently the center of gravity for the airplane during operation.

U.S. Pat. No. 5,521,827 ("'827 Patent"), entitled On-Board Aircraft Weighing and Center of Gravity Determining Apparatus and Method issued to Lindberg, et al. and assigned to the owner of the present application describes a system that includes provisions for taking pressure measurements associated with an aircraft's oleo struts at different positions between an extended position and a retracted position. The '827 Patent also references an embodiment using dynamic friction in a limited manner. The '827 Patent is incorporated herein by reference for all purposes.

SUMMARY OF THE INVENTION

In accordance with the present invention, a system and method for onboard determination of aircraft weight and balance are provided that address disadvantages and problems associated with previously developed systems and techniques.

According to an aspect of the present invention a method for determining weight on an aircraft gear strut having a strut cylinder with a working fluid and a strut piston, includes the steps of retracting and extending the strut, storing strut cylinder pressure measurements during the retraction and extension of the strut, storing acceleration measurements corresponding to each pressure measurement taken, and calculating the weight of the strut based on the pressure measurements and the acceleration measurements.

According to another aspect of the present invention an on-board aircraft system for determining the weight and load-related characteristics of an aircraft having landing gear struts, which each have a strut cylinder, a strut piston, and a working fluid in the strut cylinder, includes an accelerometer associated with each gear strut for measuring acceleration; a pressure-adjustment means coupled to each strut cylinder for selectively adjusting the pressure in each strut cylinder to cause each landing gear strut to extend and retract; a plurality of pressure transducers coupled to the plurality of landing gear struts for measuring pressure in each strut cylinder; and a computer coupled to the accelerometer, pressure-adjustments means, and plurality of pressure transducers, the computer operable to: cause the pressure-adjustment means to retract and extend each gear strut, receive and record pressure measurements during extension and retraction of each gear strut, receive and record acceleration measurements corresponding in time to pressure measurements from each pressure transducer, store the unsprung weight of each of the plurality of gear struts, store an area dimension for each strut piston, and calculate a total weight and center of gravity of an aircraft based on the pressure measurements and acceleration measurements as recorded during extension and retraction.

An advantage of the present invention is that the weight and center of gravity of an aircraft are determined on-board the aircraft by utilizing pressure in the struts while primarily experiencing only frictional forces due to dynamic friction. Another technical advantage of the present invention is that an accelerometer is included to correct pressure measurements for acceleration. Another technical advantage of the present invention is that pressure measurements in the struts are taken during the retracting and extending motion.

BRIEF DESCRIPTION OF THE DRAWINGS

A more complete understanding of the invention and its advantages will be apparent from the detailed description taken in conjunction with the accompanying drawings in which.

DETAILED DESCRIPTION OF THE INVENTION

The preferred embodiments of the present invention and its advantages are best understood by referring to FIGS. 1–9 of the drawings, like numerals being used for like and corresponding parts of the various drawings.

Figure 1:
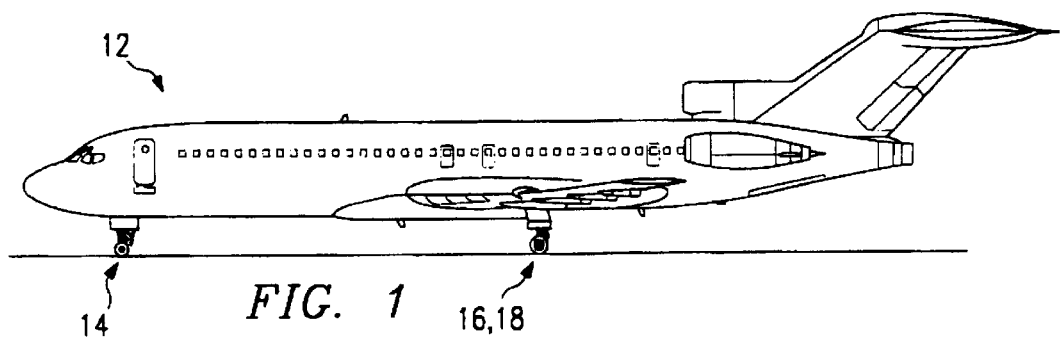
FIG. 1 is an elevational view of a typical commercial airliner with a tricycle-type landing gear with which the present invention may be readily used.

Referring to FIG. 1, there is shown an aircraft, and in particular, a commercial airliner 12 with which the present invention may be used. Commercial airliner 12 includes a tricycle-type landing gear. The tricycle-type landing gear includes a nose landing gear 14 and a port and starboard main landing gears 16 and 18. Each gear 14, 16, and 18 includes a gear strut as will be described further below.

Figure 2:
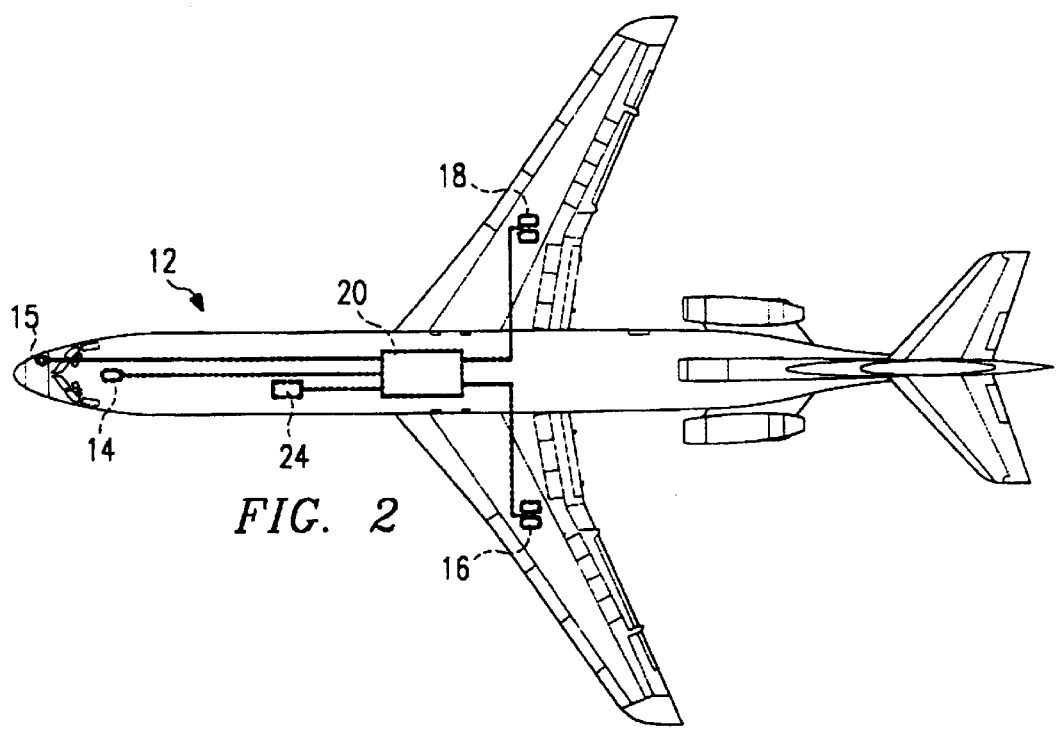
FIG. 2 is a schematic plan view of a commercial airliner including one embodiment of the present invention.

Referring now to FIG. 2, aircraft 12 is shown with one embodiment of the present invention. The present invention allows for the determination of the weight and load-related characteristics, including the center of gravity, based on the loading of nose gear 14 and main gears 16 and 18. Information is sent to and received from landing gears 14, 16 and 18 by a computer or microprocessor 20, which includes one or more storage devices, as will be described. Additionally, information from accelerometers (e.g. 68 in FIG. 3) is provided to processor 20. Also, in some embodiments, an inclinometer 24 may be included. Processor 20 is able to determine the total weight and center of gravity based on the information it receives and is able to account for the frictional drag in landing gears 14, 16 and 18 and acceleration of gears 14, 16 and 18 during weight measurement. With inclinometer 24 it may also account for uneven terrain, if any. Based on the information received, processor 20 is able to determine the weight and center of gravity which may be displayed in a number of locations including on a flight deck display 15.

The present invention may be used with any number of landing gear struts provided that the load on the landing gear is substantially carried by a working fluid such as a hydraulic fluid. For illustration purposes, a simplified, generic strut is shown in the figures.

Figure 3:
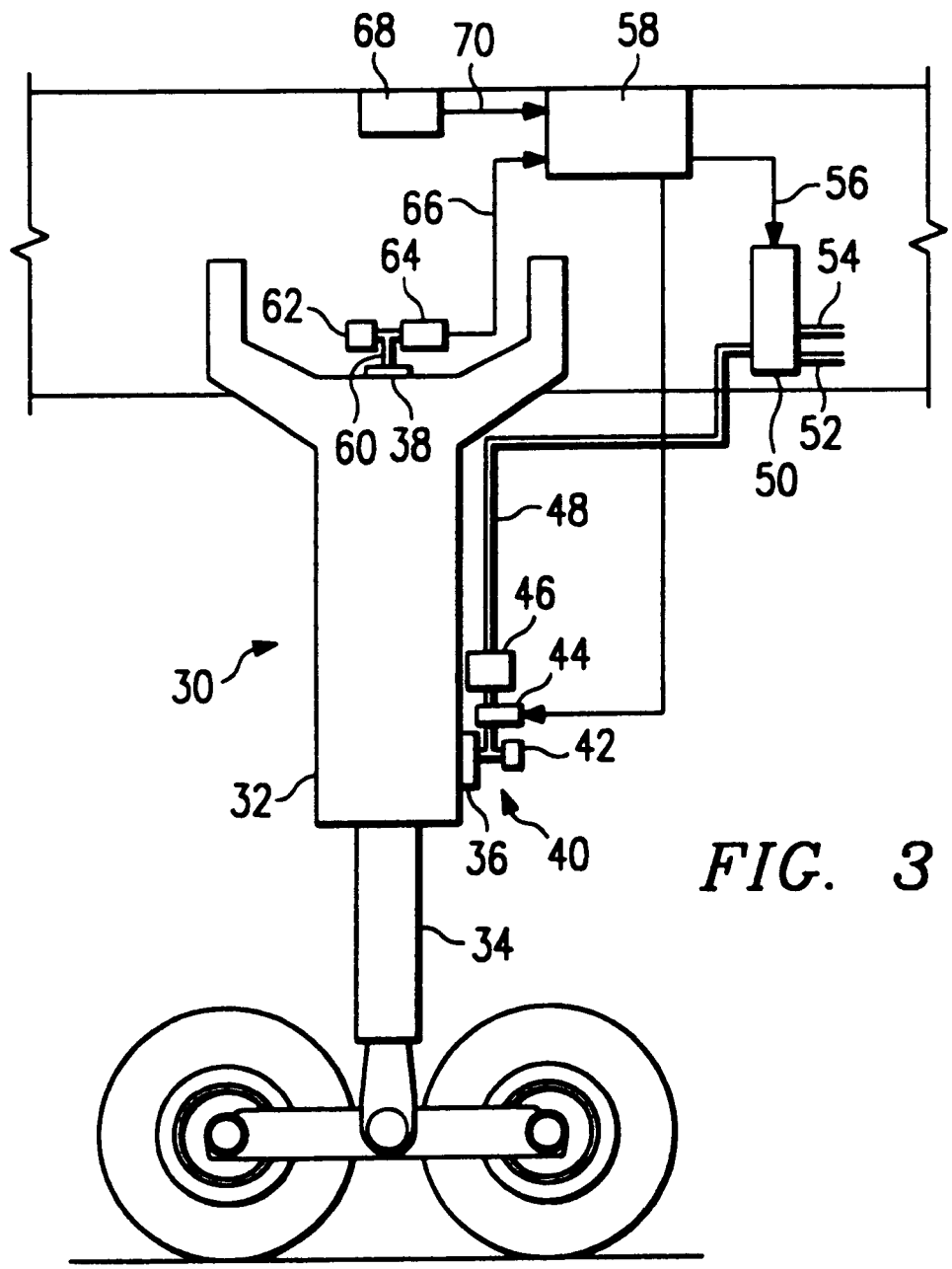
FIG. 3 is a schematic elevational view of a landing gear strut showing aspects of the present invention.
Figure 7:
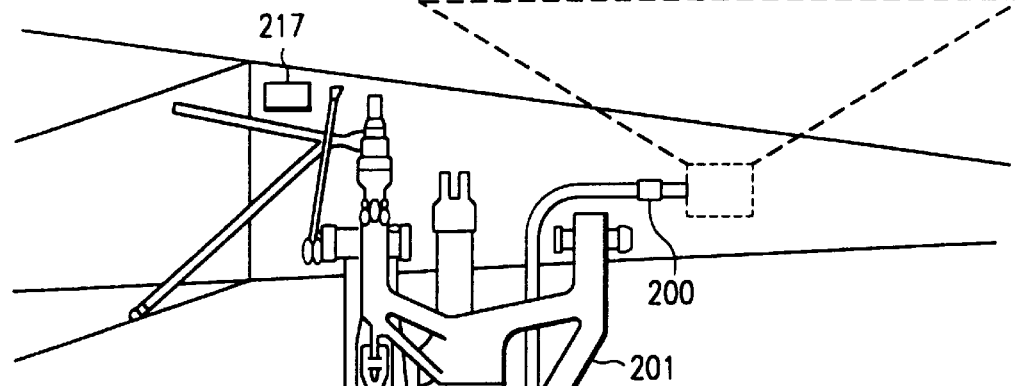
FIG. 7 is a schematic elevational view of a landing gear strut showing aspects of the present invention.
Figure 7:
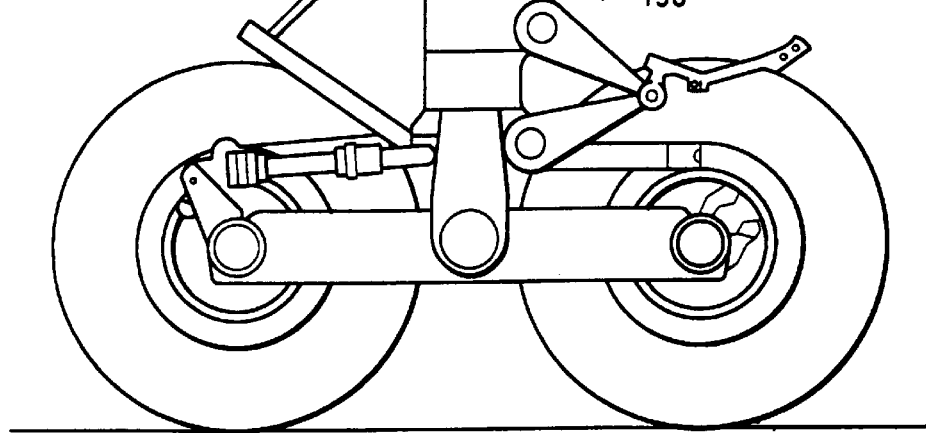

Referring to FIG. 3, strut 30 is shown. A slightly different strut is shown in FIG. 7, which is presented further below. As noted previously, any of a number of types of struts may be used, provided that they involve an internal working fluid. Strut 30 has a strut cylinder 32 and strut piston 34. Strut cylinder 32 may have a lower service port 36 and an upper service port 38. Fitting 40 may be coupled to lower service port 36.

Fitting 40 provides fluid access to a strut service valve 42 and a valve 44, which may be, for example, a solenoid valve.

Fluidly coupled to valve 44 is a pump 46. Pump 46 may be a volume displacement pump that is hydraulically or electrically powered. For the embodiment shown, pump 46 is hydraulically powered with connection to hydraulic line 48. Hydraulic line 48 is coupled to a valve such as solenoid valve 50. Also coupled to valve 50 are hydraulic fluid return line 52 and a hydraulic pressure line 54. Valve 50 may be controlled by control signals delivered on cable 56 from computer 58. Power relays are associated with pump 46 and valves 44 and 50.

Computer 58 may have a microprocessor, memory, and software to carry out operations described herein. Computer 58 may be a computer applied near strut 30 or may be remote from strut 30 or may be a combination with some processing occurring at the strut 30 and other processing occurring at a main processor computer at another location. Various components of the system may have registers and gates associated with them to implement communication with computer 58.

A fitting 60 may be coupled to upper service port 38. Fitting 60 provides fluid access for an upper service valve 62 and a pressure transducer 64. While only pressure transducer 64 is shown, multiple transducers may be applied on a portion of fitting 60 or elsewhere on cylinder 32. Pressure data developed by transducer 64 is delivered by cable 66 to computer 58.

As an important aspect of the present invention, an accelerometer 68 is coupled to the aircraft preferably near strut 30 to provide acceleration information to computer 58 over cable 70. Accelerometer 68 preferably has a regulated power supply with an analog-to-digital converter associated with it. Accelerometer 68 may digitize the measurement locally to prevent degradation during transmission over cable 70. Accelerometer 68 allows for the acceleration of strut 30 to be accounted for in weight calculations made by computer 58. By accounting for acceleration and using dynamic friction, more accurate results are obtained.

To determine the total weight on an aircraft with a tricycle-type landing gear, the weight experienced by each landing gear must be totaled; i.e., $$W_{TOTAL} = W_{NOSE} + W_{PORT} + W_{STARBOARD}$$

where $W_{TOTAL}$ equals the total weight of the aircraft;

$W_{NOSE}$ equals the weight experienced by the nose landing gear;

$W_{PORT}$ equals the weight experienced by the port main landing gear; and $W_{STARBOARD}$ is equal to the weight experienced by the starboard main landing gear.

The present invention allows the weight experienced by each landing gear to be determined or accurately approximated from the pressure experienced within the landing gear cylinder. The weight of the landing gear below the cylinder (dead weight, tare weight, or unsprung weight) should be configured into the software of the processor 20 so that it will be added to the weight determined from the pressure measurements to arrive at a total weight on the strut. To determine the weight on the strut, the observation is made that the force on each landing gear is equal to the relevant piston surface area times the pressure plus or minus the frictional or drag forces experienced by the interaction of the piston in the cylinder.

Figure 4:
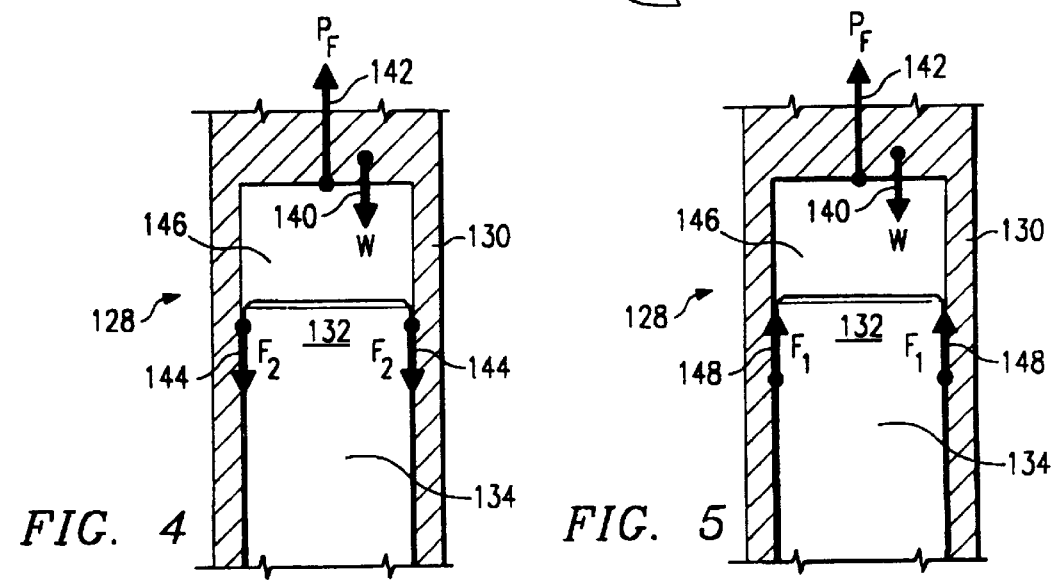
FIG. 4 is a schematic diagram showing a simplified representation of forces on a portion of a landing gear strut.

The problem and solution to addressing the frictional drag forces in the struts may be explained with reference to FIGS. 4 and 5. FIG. 4 is a schematic diagram of a landing gear cylinder 130 having a piston 132 shown during retraction. The metering pin and other details are omitted for simplicity. Piston body 134 ultimately communicates the load to the tires of the landing gear associated with cylinder 130, and an upper portion of cylinder 130 attaches to the main body of aircraft 12. The landing gear 128 shown experiences a downward force or weight shown with a representative vector 140, W. The weight vector 140 is countered by a pressure force designated by vector 142. In FIG. 4, the frictional interaction between piston 132 and cylinder 130 is creating a downward frictional force with respect to cylinder 130 as indicated by vectors 144 for the orientation shown.

Figure 5:
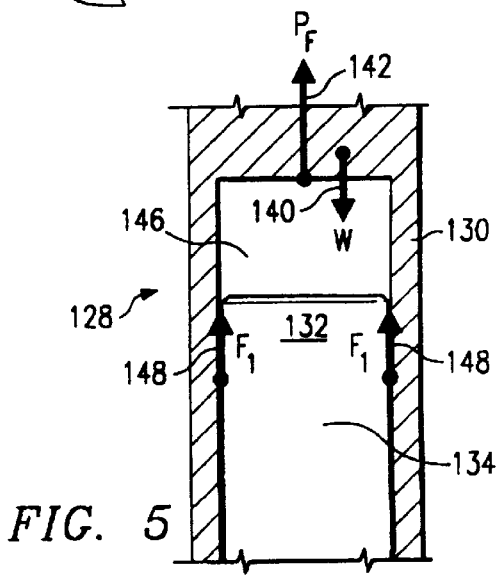
FIG. 5 is a schematic diagram showing a simplified representation of forces on a portion of a landing gear strut.

A similar situation is shown in FIG. 5, except this time the frictional forces are in the upward direction (for the orientation shown) and designated by vectors 148. FIG. 5 shows frictional forces opposing the extension of the landing gear strut. In both FIGS. 4 and 5, the combined resultant forces (frictional, pressure, and weight) will equal the mass times acceleration. In contrast, FIG. 4 shows the frictional forces opposing the retraction of the strut. The resultant forces in FIG. 4 will also equal the mass times acceleration.

As an important aspect of the present invention, the use of dynamic pressure readings are used to obtain more accurate weight measurements while accounting for acceleration. Dynamic pressure measurements taken while the strut is in movement causes the frictional forces to be based on the dynamic coefficient of friction. This causes the friction forces to be smaller. That in turn allows more precise measurements. Because the measurements are taken during movement, however the acceleration of the object should be accounted for.

With acceleration and pressure measured, an appropriate equation may be used to determine the weight. The following development of an appropriate equation is for illustrative purposes; other mathematical techniques may be used for determining the weight given the acceleration and pressure. As noted above, the resultant forces on a given strut must equal the mass times acceleration.

$$F = ma \tag{1}$$

In the above equation "F" is in pounds, "m" is mass in inertial units, and "a" is in acceleration in feet per second per second; of course, other coherent systems of units may be used.

To prepare to work with this equation, two observations are made. First, the mass associated with the strut may be represented by the following equation:

$$W = mg \quad m = \frac{W}{g} \tag{2}$$

Second, the resultant force may be expressed as the proper combination (either substraction or addition) of the frictional forces (f) and the pressure (P) times the relevant area (A) of the strut piston and strut cylinder.

$$F = PA \pm f \tag{3}$$

Substituting in equations 2 and 3 into equation 1, leads to the following expression for a retracting gear strut:

$$AP_r + f_r = W\left(\frac{a}{g}\right)_r \tag{4}$$

In a similar manner, substituting in equations 2 and 3 into equation 1 for an extending gear strut leads to the following expression:

$$AP_e - f_e = W\left(\frac{a}{g}\right)_e \quad (5)$$

In the above two expressions and as used hereafter, subscript "r" means during retraction and subscript "e" means during extension. To simplify the derivation here, accelerations may be defined as a dimensionless ratio to unit gravity (1 g):

$$a_r = \left(\frac{a}{g}\right)_r \quad (6)$$

$$a_e = \left(\frac{a}{g}\right)_e \quad (7)$$

Substituting equations 6 and 7 into equations 4 and 5, respectively leads to the following equations which have been solved for the weight:

$$W = \frac{AP_r + f_r}{a_r} \quad (8)$$

$$W = \frac{AP_e + f_e}{a_e} \quad (9)$$

To obtain a fairly good estimate of the weight on a strut, one may assume that the frictional forces during extension and the frictional forces during retraction will cancel each other when equations 8 and 9 averaged; that is, we may assume for purposes of estimation that the frictional forces during retraction are the same or approximately the same as the frictional forces during extension except in the opposite direction. This leads to the following two expressions which may be averaged to arrive at an estimate of the weight on the strut:

$$W_r = \frac{AP_r}{a_r} \quad (10)$$

$$W_e = \frac{AP_e}{a_e} \quad (11)$$

When the above two equations 10 and 11 are averaged to arrive at the weight, the frictional forces are assumed to be substantially identical but in opposite directions.

For precision and accurate weighing, the above assumption about the frictional forces is not satisfactory. A significant further improvement is obtained by a rigorous analysis of the friction forces.

In the subject invention, the dynamic friction is encountered with the same strut seals moving over the same piston area, only in opposite directions, so the same coefficient of friction applies to all. The magnitude of each component is therefore proportional to the force of the seals against the piston which is in turn proportional to the pressure in the strut. Thus, friction forces are proportional to strut pressure. So the two friction components are related as follows:

$$\frac{f_r}{P_r} = \frac{f_e}{P_e} \quad (12)$$

Solving equation 12 for friction during retraction, leads to the following expression:

$$f_r = f_e\left(\frac{P_r}{P_e}\right) \quad (13)$$

Substituting in equation 13 into equation 8 leads to the following expression:

$$W = \frac{AP_r + f_e\left(\frac{P_r}{P_e}\right)}{a_r} \quad (14)$$

Rearranging and setting equation 14 equal to the right side of equation 9 we arrive at the following:

$$\frac{AP_r}{a_r} + \frac{f_e\left(\frac{P_r}{P_e}\right)}{a_r} = \frac{AP_e}{a_e} - \frac{f_e}{a_e} \quad (15)$$

Simplifying the above expression by using the defined expressions of equations 10 and 11 leads to the following:

$$W_r + \frac{f_e\left(\frac{P_r}{P_e}\right)}{a_r} = W_e - \frac{f_e}{a_e} \quad (16)$$

Solving expression 16 for $f_e/a_e$ leads to equation 19 as follows:

$$\frac{f_e}{a_e} + \frac{f_e\left(\frac{P_r}{P_e}\right)}{a_r} = W_e - W_r \quad (17)$$

$$\frac{f_e}{a_e}\left(\frac{1 + \left(\frac{P_r}{P_e}\right)a_e}{a_r}\right) = W_e - W_r \quad (18)$$

$$\frac{f_e}{a_e} = \frac{W_e - W_r}{\left(\frac{P_r}{P_e}\right)\left(\frac{a_e}{a_r}\right) + 1} \quad (19)$$

Equation 19 may then be substituted into equation 9 along with the simplifications provided by equations 10 and 11 to arrive at the following expression for the weight on the strut:

$$W = W_e - \left|\frac{W_e - W_r}{\left(\frac{P_r}{P_e}\right)\left(\frac{a_e}{a_r}\right) + 1}\right| \quad (20)$$

It should be apparent that a similar equation could be derived through other analogous algebraic approaches, and equation (20) and analogous expressions may be referred to as an "acceleration-pressure equation" for weight. Note that equation 20 may be solved for the weight on the strut piston by substituting values for the acceleration ratios ($a_e$ and $a_r$) and for strut pressures ($P_e$ and $P_r$) from one data point retracting and one data point extending for the strut. The acceleration during extension and retraction need not be the same and a very short extension or retraction may be used. This approach addresses frictional forces in the struts as well as acceleration during motion that allows only dynamic frictional forces to apply. In carrying out this approach, a number of numerical enhancements may be made during the process. For example, numerous data points may be stored and averaged to provide for improved results by reducing random errors and the effects of noise on the data.

Referring again to FIG. 3, one approach to determining the weight and load-related characteristics, e.g., CG of the aircraft is described. An operator may select an appropriate command linked with processor 58 to initiate the weighing process. According to the method described here, the following would then occur:

1. Power supplies are energized applying power to the pressure transducer 64, accelerometer 68, and any local data processing circuits. These items are given a short time to stabilize.

2. Readings are taken from accelerometer 68 and stored as a "1 g reference."

3. The strut isolation valve 44 is opened permitting pressure in strut cylinder 32 to force the strut fluid into pump 46. Pump control valve 50 in its de-energized state vents the driving side of a pump piston to the aircraft hydraulic system return line 52 so that the pump system piston is free to move to accept the strut fluid.

4. As fluid leaves the strut 30, the gas pressure above the strut piston 34 is reduced by expansion to the added volume. When gas pressure is reduced until the difference between the supporting force of the gas and the weight on the strut 30 exceeds static friction, the strut will start to retract; its acceleration becomes less than 1 g.

5. Acquisition of acceleration and pressure data is begun and stored in processor 58.

6. The pump control valve 50 is energized and aircraft hydraulic power 54 forces the strut fluid in the pump back into the strut 30.

7. This compresses the gas in the strut 32, brings the strut 30 to a stop, and reverses strut direction to an extending motion. Fluid return from the pump 46 stops when the pump piston bottoms. At this point all fluid removed from strut cylinder 32 has been returned to it and the strut 30 has the same charge as when the weight cycle began.

8. The strut will continue to extend until it reaches equilibrium.

9. Acquisition of accelerometer and pressure data, which has occurred during the extension and retraction, is terminated.

10. The strut isolation valve 42 is closed to prevent further change in the strut charge. The pump control valve 50 is then closed isolating the weighing system from aircraft hydraulic pressure.

11. Weight and balance calculations may be performed by processor 58 and then presented to the operator.

The output of the accelerometer 68 used in the foregoing sequence may be restricted to a narrow range around 1 g and this range expanded to near full scale of the analog-to-digital converter to reduce noise while utilizing the full resolution of the accelerometer. An accelerometer having a digital output is preferred in the present invention. The 1 g reference reading is digitized when taken so as to experience no additional drift while being used as a reference. The above sequence is but one example of how the system and methods of the present invention may be utilized.

As indicated above, with pressure readings and acceleration readings, the weight and balance calculations may be performed by the processor and software associated with computer 58. A number of techniques may be used by computer 58 to arrive at the weight on each strut from the pressure and acceleration data.

One approach for determining the weight, is to utilize equation 20 above or an analogous expression for each strut. This allows the weight on each strut to be determined from the underlying pressure and acceleration measurements. The weight on each strut may then be combined for the overall aircraft weight. Once the weight on each strut is known, both the longitudinal and lateral center gravities may also be calculated. Other load-related characteristics may be determined, such as the amount of additional weight that may be loaded given the current takeoff conditions such as length of runway, temperature, wind, speed, density altitude, etc. as described further below.

To arrive at the weight on each strut and to perform the weight and balance calculations, the effective area of each strut piston 34 and the total tare weight or weight of unsprung components of each strut 30 (e.g., piston assembly, wheels, tires, brake assemblies, etc.) may be stored in computer 58. Computer 58 may multiply the pressure of each strut by its relevant piston area to arrive at the force to be used in the equations referenced above. Once the weight has been determined according to the techniques described above, the tare weight associated with each strut may be added. The sum of the three weights calculated on each strut may then be totaled to arrive at the total aircraft weight.

Computer 58 may also have stored within it the aircraft station line of each of the landing gears and with the forward and aft limits of the mean aerodynamic chord (MAC). The weight on each strut or gear may then be multiplied by a station line and the resulting three moments added together. This sum may be divided by the aircraft gross weight to yield the station line of the center of gravity (CG). The station line of the CG may be displayed as such or its location as a percentage of MAC may be calculated by dividing (CG station minus forward limit of MAC) by (aft limit of MAC minus forward limited of MAC) then multiplying by 100. In some cases, especially for very wide-bodied jets, lateral location of the center of gravity may also be helpful. In this case, the buttline of the center of gravity may be determined by multiplying the weight on each main gear by its buttline, which is stored in computer 58 with its sign convention (e.g., +for left, –for right) and dividing the algebraic sum of these moments by the sum of the weight on the two main gears.

The data and results may be displayed in the cockpit and/or relayed by telemetry or other means to a ground station for monitoring. Further processing of the data may be performed with additional measurements such as temperature, pressure altitude, and wind to display additional information to the pilots. With the weight data, temperature, pressure altitude, wind, and runway length, (i.e., actual takeoff conditions), and with other appropriate information (e.g., manufacturer's performance and limitations data or FAA regulations), the takeoff decisions or additional loading decisions for a given runway length may be made without delay.

Figure 6:
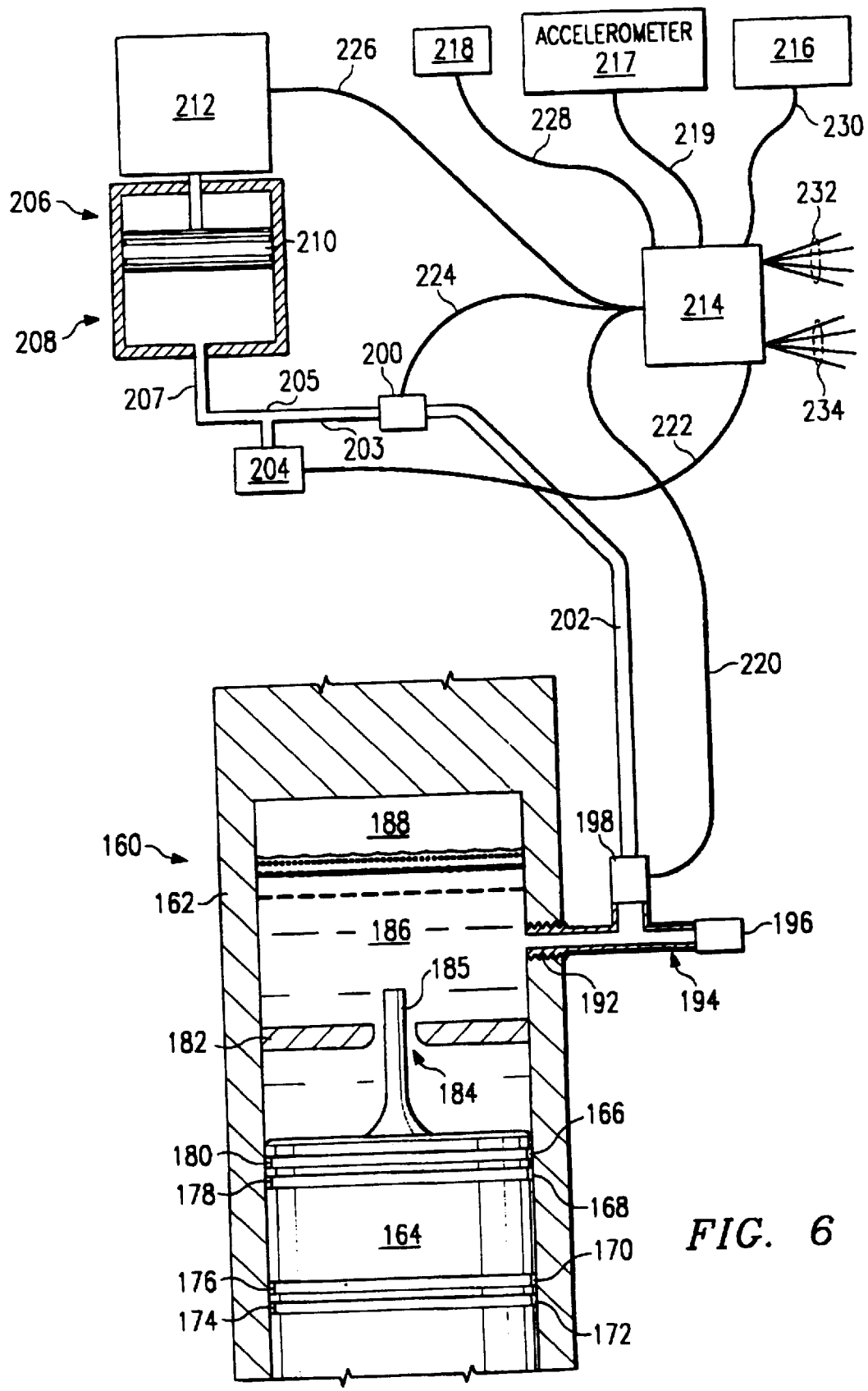
FIG. 6 is a schematic diagram of one embodiment of the present invention.

Referring now to FIG. 6, a schematic diagram of another embodiment or system of the present invention is shown. A portion of a landing gear strut 160 is shown having a cylinder 162 and a piston 164. Piston 164 may include a plurality of O-rings such as rings 166–180 and a metering pin 185, which is shown in simplified shape. For the type of oleo strut or landing gear 160 shown, an orifice plate 182 is included, which has orifice opening or aperture 184. Cylinder 162 is filled with a working fluid 186, such as a hydraulic fluid. Additionally, a pressurized gas 188 may be included. Pressurized gas 188 may be, for example, nitrogen. Piston 164 ultimately communicates forces to the tire or tires of landing gear 160.

For the embodiment shown in FIG. 6, a check valve may be removed and a T-fitting 194 may be secured in opening 192 in the side wall of cylinder 162. T-fitting 194 allows fluid communication of the working fluid in cylinder 162 with a check valve 196 and a first electronically-responsive, shut-off valve 198. Shut off valve 198 may be coupled to an optional second, or back up, electronically-responsive, shut-off valve 200 by high pressure hosing or lines 202. Continuing downstream from optional second valve 200 is a sensitive pressure transducer 204. Pressure transducer 204 may be any of a number of highly reliable and sensitive pressure transducers that are appropriate to the range of pressures that may be experienced. One suitable pressure transducer that may be used with the present invention is a CEC 5500 pressure transducer available from CEC Instruments, San Dimas, Calif., which is a subdivision of IMO Industries, Inc.

Downstream from pressure transducer 204 is a fluid pump 206 and fluid reservoir 208. Fluid pump 206 is electronically responsive to control signals from computer 214 as will be described further below. Fluid pump 206 may be any of a number of pumps used to move fluids, but in the example shown, is a piston operated displacement pump. Piston 210 of the pump is maneuvered by a motor 212 which may be moved in response to electrical signals, as will be described further below. It should be noted that pump 206 need not be in-line with pressure transducer 204 or valve 198, but could in fact be in fluid communication with fluid 186 through a separate fitting (not shown) separate from fitting 196.

The system further includes a computer 214 with a microprocessor having a data storage device coupled thereto, such as a memory or other device. Computer 214 is coupled to a display 216 such as a CRT which may be located in the flight deck. Additionally, other optional displays may be placed at other locations such as for the personnel loading cargo onto the aircraft 12 to view.

The system may also include an inclinometer 218 for providing pitch data to computer 214. Inclinometer 218 may be for example a liquid-filled torodial sensor and electronics to amplify and filter the output signal as necessary such that the amplitude of the output signal would be directly proportional to the horizontal angle of this sensor with respect to the gravitational field. Because most airports are sufficiently level, inclinometer 218 may be omitted.

As an important feature of the present invention, the system also includes an accelerometer 217. Accelerometer 217 is coupled by cable 219 to computer 214. Accelerometer 217 allows the acceleration of the aircraft to be accounted for in the computations performed in computer 214 to determine the weight on the strut 160.

Computer 214 is electronically coupled to valve 198 by cable 220 as may be appropriate. Computer 214 is coupled to pressure transducer 204 by cable 222. Computer 214 may be coupled to optional second valve 200 by cable 224. Pump 206, and specifically for the embodiment shown motor 212, is coupled to computer 214 by cable 226. Inclinometer 218 is coupled to computer 214 by cable 228. Display 216 is coupled to computer 214 by cable 230. The embodiment shown in FIG. 6 shows only one strut 160, but is to be understood that the other landing gear struts for the aircraft 12 would be tied into computer 214 in an analogous manner. For example, a plurality of cables 232 would be coupled to another gear and a plurality of cables 234 would be coupled to the other gear for a tricycle-type aircraft 12. For each gear, the pump, electronically-responsive shut-off valves and pressure transducer are coupled to the microprocessor; the pump, electronically-responsive shut-off valve, and pressure transducer associated with each strut may be referred to as a pressure-measuring-and-adjusting subsystem.

Referring now to FIG. 7, the attachment of the T-fitting 194 to strut 160 is shown for an elevational view. T-fitting 194 is secured to strut 160; and check valve 196, which has cap 195, is secured to one end of T-fitting 194. Electronically-responsive, in-line shut-off valve 198 is secured to another portion of T-fitting 194. Hose 202 is downstream of shut off valve 198 and is in fluid communication with optional second shut off valve 200.

Figure 8:
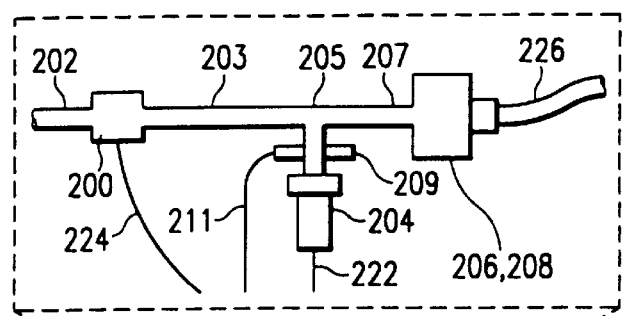
FIG. 8 is a detail of a portion of the present invention as shown in FIG. 7.

Referring to the detail shown in FIG. 8, it can be seen that hose 203 is downstream of valve 200 leading to T configuration 205 that ties into pressure transducer 204 and to an other downstream hose 207. For t he embodiment shown in FIG. 8, an additional shut off valve 209 has been included to provide additional protection to transducer 204. Downstream of line 207 is pump and reservoir 206 and 208. It is to be understood that numerous types of pumps and reservoir configurations can be used and are contemplated as being within the scope of the present invention.

Figure 9:
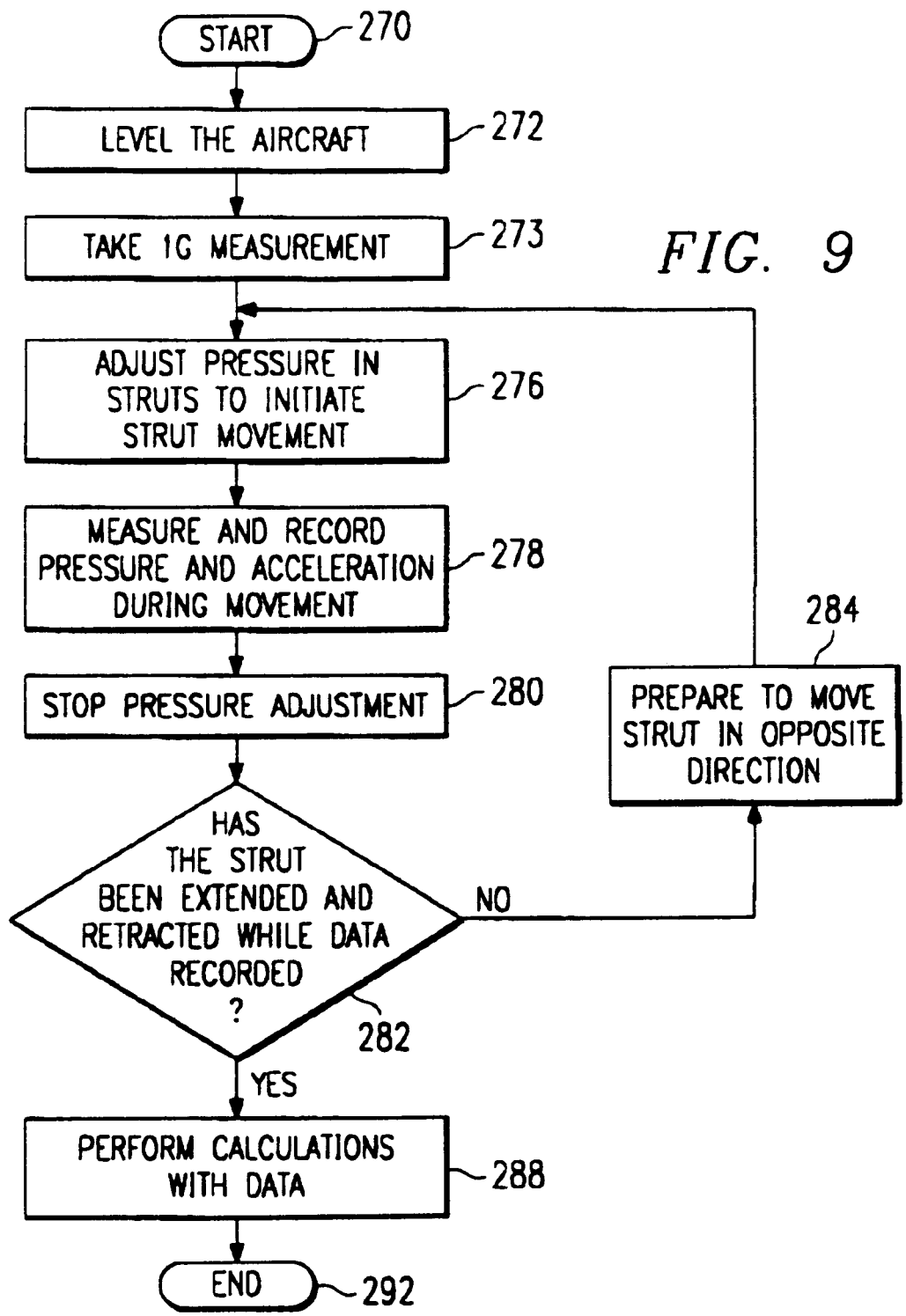
FIG. 9 is a flow chart showing aspects of one method of the present invention.

Referring now to FIG. 9, the basic steps of a method of practicing the present invention are shown. After starting at block 270, the first step that may be accomplished is the leveling of the aircraft at step 272. The leveling step is completely optional, and given the appropriate construction of most commercial airports and runways, it may be unnecessary. Indeed, an inclinometer may be left off the system altogether if desired.

In order to level the aircraft, the inclinometer, e.g. 24 (FIG. 2) or 218 (FIG. 6), provides information to computer 58 or 214 that is indicative of the pitch of the aircraft with respect to the aircraft's pitch attitude and the gravity field. Based on the information received from inclinometer 218, computer 58 or 214 may lower or raise nose gear 14 or lower and raise the main gears 16 or 18 in order to make the aircraft 12 level; for example, if it is determined that the nose is high such that there is a positive pitch angle, the strut associated with the nose landing gear 14 may have the pressure reduced allowing the strut to retract slightly and to level the plane or alternatively the struts associated with the main gears 16 and 18 may be further extended. Computer 58 or 214 sends out instructions or control signals to appropriate valves over cables, e.g., 220 and 56, and to the respective pump 46 or 214 over cables. For example, instructions may be provided to pump 206 over cable 226 to accomplish the desired movement of the strut.

An initial determination of the local gravity may be taken by measuring the acceleration with an accelerometer 68 or 217 as shown at block 273. The acceleration reflects a 1 g measurement.

At block 276, movement of the strut is initiated. This movement may first be in an extension direction or a retraction direction. Movement may be initiated by adjusting the pressuring—either decreasing it or increasing it within the strut cylinder. Once movement is initiated, primarily the dynamic coefficient of friction will be involved in the frictional forces between the cylinder and piston. During the movement, pressure and acceleration data are recorded as reflected at box 278. Pressure and acceleration can be used with a number of mathematical approaches such as solving equation 20, above, to determine the weight on the strut. When at least one pressure measurement has been taken in the direction of movement, the movement may be stopped by adjusting the pressure as shown at block 280.

At interrogatory box 282, a determination is made as whether or not the strut has been both extended and retracted while data has been recorded. If not—i.e., data has only been taken in one direction—the strut is prepared for movement in the opposite direction at bock 284. The activities associated with blocks 276, 278 and 280 are then repeated. Once interrogatory box 282 is answered in the affirmative, calculations are performed on the data as indicated in block 288. Calculations in block 288 may include determining the weight on each strut, the overall weight of the aircraft, the lateral center of gravity, longitudinal center of gravity, and how much additional weight may be added for the actual takeoff conditions including runway length, wind, density altitude, etc. The wind speed and direction, temperature, pressure, altitude, and runway length are additional data that may be entered for use in some calculations. Furthermore, performance data from the manufacturer or limitations set by the FAA may also be entered for calculations by the computer. The additional information allows for calculations such as how much additional weight may be added for the given actual takeoff conditions.

The resultant information and data from the system and methods may be presented on a display on the flight deck of the aircraft. The information may also be relayed to a base where data is monitored and/or stored.

Although the present invention and its advantages have been described in detail, it should be understood that various changes, substitutions, and alterations can be made therein without departing from the spirit and scope of the invention as defined by the appended claims. For example, while cables are presented in the embodiments, it is to be understood that any form of telemetry or means of communicating with various components may be utilized.

What is claimed is:

1. In an on-board system for determining the weight and center of gravity of an aircraft having a plurality of oleo struts, each having a strut piston and strut cylinder with a working fluid, the system comprising:
   a computer operable to develop control signals and to receive and store pressure measurement signals and acceleration measurement signals and to perform calculations;
   a display coupled to the computer for displaying visual indicia;
   a plurality of pressure-measuring-and-adjusting subsystems, one pressure-measuring-and-adjusting subsystem associated with each of the plurality of oleo struts, each pressure measuring and adjusting subsystem comprising:
      (i) a fitting attached to the associated oleo strut for accessing the working fluid therein;
      (ii) a first in-line, electronically-responsive valve coupled to the fitting for controlling fluid flow through the fitting and electrically coupled to the computer,
      (iii) a pressure transducer fluidly coupled to the strut cylinder for measuring the pressure of the working fluid, the pressure transducer coupled to the computer and operable to provide a pressure measurement signal to the computer, and
      (iv) an electronically-responsive pump fluidly coupled to the strut cylinder for adjusting the fluid pressure of the working fluid to extend or retract the strut in response to control signals from the computer;
   an accelerometer associated with each strut for developing acceleration measurements; and
   wherein the computer is further operable in determining weight to account for acceleration measurements corresponding to pressure measurements.

2. The on-board system of claim 1 wherein the computer is operable to record a multiplicity of pressure and acceleration measurements and determine weight of the aircraft.

3. The on-board system of claim 1 wherein the computer is operable to account for acceleration measurements by recording acceleration measurements and pressure measurements during retraction and extension of the strut and to solve for weight according to an acceleration-pressure equation.

4. The on-board system of claim 3 wherein the acceleration-pressure equation is as follows:

$$W = W_e - \left[ \frac{W_e - W_r}{\left(\frac{P_r}{P_e}\right)\left(\frac{a_e}{a_r}\right) + 1} \right]$$

where
$a_e$ is the ratio of strut acceleration to gravity during extension is $$\left(\frac{a}{g}\right)_e,$$

$a_r$ is the ratio of strut acceleration to gravity during retraction, $$\left(\frac{a}{g}\right)_r$$

$P_r$ is the pressure measurement during retraction,
$P_e$ is the pressure measurement during extension,
$W_e$ is $$\frac{AP_e}{a_e}$$

is in which A is piston area, and
$W_r$ is $$\frac{AP_r}{a_r}.$$

5. An on-board aircraft system for determining the weight and center of gravity of an aircraft having a plurality landing gear struts each having a strut cylinder, a strut piston, and a working fluid in the strut cylinder, the system comprising:
   an accelerometer associated with each gear strut for measuring acceleration;
   a pressure-adjustment means coupled to each strut cylinder for selectively adjusting the pressure in each strut cylinder to cause each landing gear strut to extend and retract;
   a plurality of pressure transducers coupled to the plurality of landing gear struts for measuring a pressure in each strut cylinder; and
   a computer coupled to the accelerometer, pressure-adjustments means, and plurality of pressure transducers, the computer operable to:
      (a) cause the pressure-adjustment means to retract and extend each gear strut,
      (b) receive and record pressure measurements from each pressure transducer recorded during extension and retraction of each gear strut,
      (c) receive and record acceleration measurements from the accelerometer corresponding in time to pressure measurements from each pressure transducer,
      (d) store the unsprung weight of each of the plurality of gear struts, (e) store an area dimension for each strut piston, and (f) calculate a total weight and center of gravity of an aircraft based on the pressure measurements from each pressure transducer and acceleration measurements from the accelerometer recorded during extension and retraction.

6. The system of claim 5, further comprising an inclinometer coupled to the computer, and wherein the computer is further operable to level an aircraft based on information from the inclinometer and by adjusting the pressure-adjustment means.

7. The system of claim 5, further comprising a flight deck display coupled to the computer for displaying the center of gravity and weight and determined by the computer.

8. The system of claim 5, wherein the computer is operable to calculate the total weight by determining a weight on each gear strut by receiving and recording the pressure measurement from the pressure transducer associated with the strut and the acceleration measurement, during retraction, $P_r$ and $a_r$, and during extension, $P_e$ and $a_e$, and to determine the weight on each strut according to an acceleration-pressure equation.

9. The system of claim 8 wherein the acceleration-pressure equation is as follows:

$$W = W_e - \left[ \frac{W_e - W_r}{\left(\frac{P_r}{P_e}\right)\left(\frac{a_e}{a_r}\right) + 1} \right]$$

where $a_e$ is the ratio of strut acceleration to gravity during extension is $$\left(\frac{a}{g}\right)_e,$$

$a_r$ is the ratio of strut acceleration to gravity during retraction, $$\left(\frac{a}{g}\right)_r,$$

$P_r$ is the pressure measurement during retraction,
$P_e$ is the pressure measurement during extension,
$W_e$ is $$\frac{AP_e}{a_e}$$

in which A is piston area, and
$W_r$ is $$\frac{AP_r}{a_r}.$$

10. The system of claim 8, wherein the computer is further operable to receive performance data and limitations and current takeoff conditions (length of runway, wind data, pressure altitude) and estimate additional weight that may be loaded on the aircraft.

11. A method for determining weight on an aircraft gear strut having a strut cylinder with a working fluid and a strut piston, the method comprising the steps of:

retracting and extending the strut;

taking and storing strut cylinder pressure measurements during the retraction ($P_r$) and extension ($P_e$) of the strut;

taking and storing acceleration measurements ($a_r$ and $a_e$) corresponding to each pressure measurement taken; and calculating the weight on the strut based on the pressure measurements and the acceleration measurements.

12. The method of claim 11 wherein the step of calculating the weight on the strut comprises solving for weight in an accelerator-pressure equation.

13. The method of claim 12 wherein the step of solving for weight in an acceleration-pressure equation comprises solving for height in the following expression:

$$W = W_e - \left[ \frac{W_e - W_r}{\left(\frac{P_r}{P_e}\right)\left(\frac{a_e}{a_r}\right) + 1} \right]$$

where $a_e$ is the ratio of strut acceleration to gravity during extension is $$\left(\frac{a}{g}\right)_e,$$

$a_r$ is the ratio of strut acceleration to gravity during retraction, $$\left(\frac{a}{g}\right)_r,$$

$P_r$ is the pressure measurement during retraction,
$P_e$ is the pressure measurement during extension,
$W_e$ is $$\frac{AP_e}{a_e}$$

in which A is piston area, and
$W_r$ is $$\frac{AP_r}{a_r}.$$

* * * * *